Dec. 20, 1927.　　　　　　　　　　　　　　　　　　1,653,216
F. KOHLBERGER
SEAT FOR VEHICLES
Filed Dec. 18, 1924

INVENTOR
Frank Kohlberger
BY Redding,
Greeley, O'Shea and
Campbell ATTORNEYS

Patented Dec. 20, 1927.

1,653,216

UNITED STATES PATENT OFFICE.

FRANK KOHLBERGER, OF WHITESTONE, NEW YORK, ASSIGNOR TO INTERNATIONAL MOTOR COMPANY, OF NEW YORK, N. Y., A CORPORATION OF DELAWARE.

SEAT FOR VEHICLES.

Application filed December 18, 1924. Serial No. 756,638.

In a co-pending application by August H. Leipert, Serial No. 704,307, filed April 5, 1924, there is disclosed a construction and suspension of seats for vehicles designed with particular reference to seats for motor vehicles having as its object the cushioning of road shocks, for instance, by the provision of non-metallic yielding suspension means for the seat frame and the elimination of use of metallic or similar spring elements. The present invention has for its object to provide a suspension for a vehicle seat which will afford a greater latitude of movement of the vehicle seat while at the same time permitting a construction in which the arms and back are unitary therewith. A further object of the invention has to do with problems of manufacture and assembly in the interest of simplicity and cheapness of results. In order that the invention may be clearly understood and readily carried into effect the same will now be described more fully with reference to the accompanying drawings illustrating a preferred embodiment thereof in which:

Figure 1:
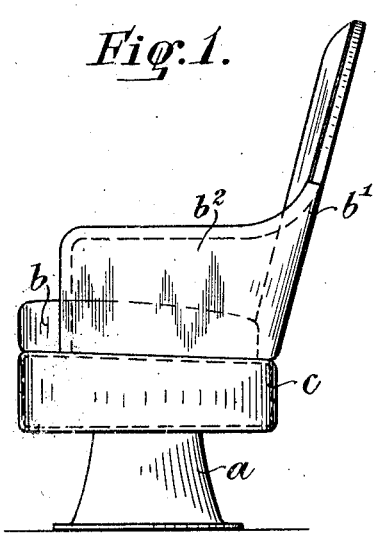
Figure 1 is a view in side elevation showing the vehicle seat according to the present invention.
Figure 2:
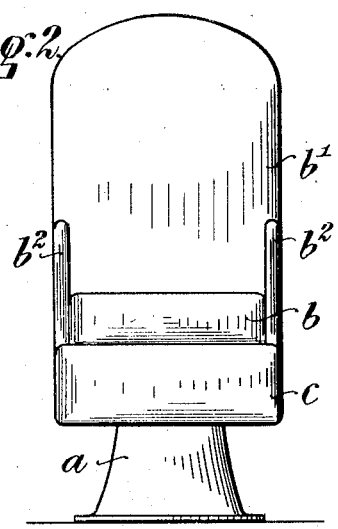
Figure 2 is a view in front elevation of the vehicle seat.
Figure 3:
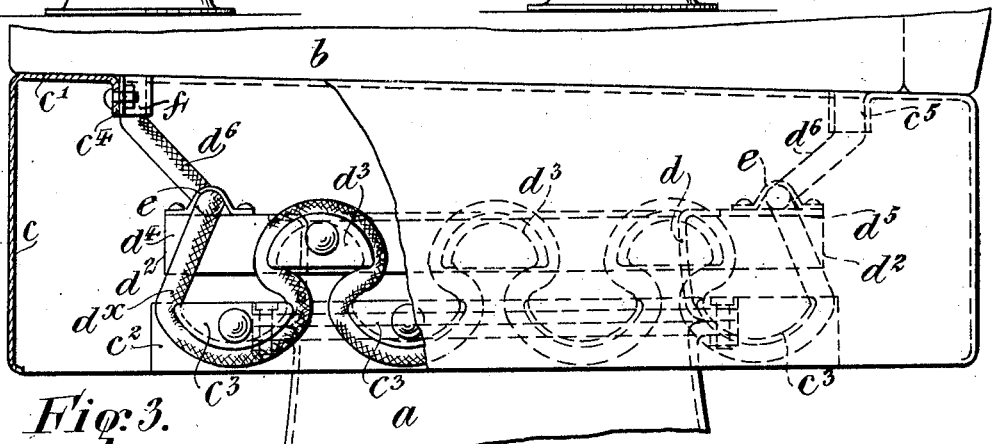
Figure 3 is a fragmentary side view, partly in section, showing the manner in which the yielding non-metallic cord is associated with the vehicle seat and base therefor to serve as a yielding non-metallic connection and support therebetween.
Figure 4:
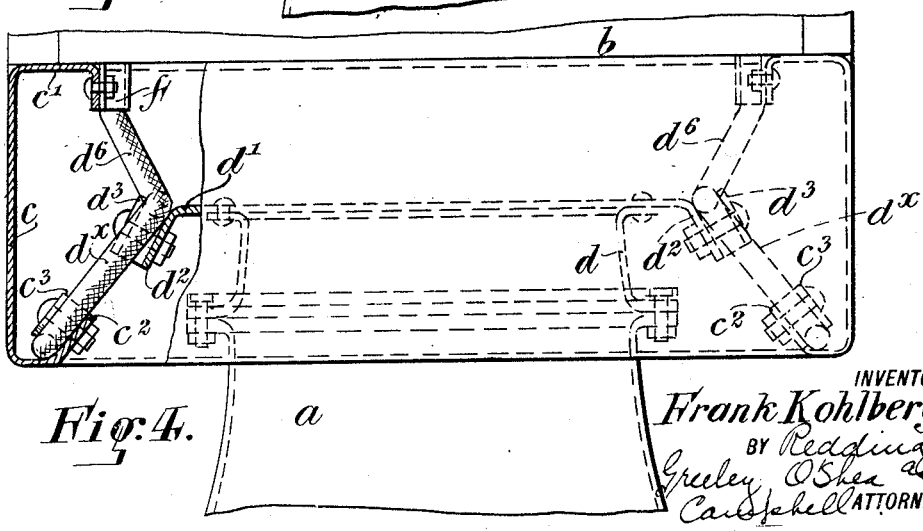
Figure 4 is a view similar to Figure 3 but showing fragmentary portions of the seat and base when looking from the front.

The invention is not concerned primarily with the specific form taken by the seat as such forms no part of the present invention. The drawings are intended to illustrate merely a conventional type of single seat adapted for use in motor busses of the more luxurious type and in which central pedestals or bases $a$ are adapted to rest upon the floor of the vehicle and support a seat $b$ having a back $b'$ and arms $b^2$. The principal object of the present invention is to effect the support of the seat $b$ by the base $a$ is a simple and inexpensive manner wherein the assembly of parts will be facilitated and advantage had of adequate mechanical strength with yielding properties which while insuring comfort will avoid such objections as are found in metallic connections. By forming the seat $b$, back $b'$ and arms $b^2$ as a unitary section supported yieldingly on the pedestal $a$ the passenger may be carried with the utmost comfort since no relative movement between the arms, back and seat is possible and therefore no resultant disarrangement of clothing will ensue.

The invention is not to be limited to the particular manner in which the suspension means are availed of, the illustration and the following description being given merely as indicative of one way of using yielding non-metallic cords for the support of the seat. The frame of the seat is preferably formed as a pressed metal rectangular portion $c$ upon the turned over upper edges $c'$ of which the seat cushion $b$ rests and which is adapted to surround the upper portion of pedestal $a$. The bottom side edges of frame $c$ turn inwardly at an angle as at $c^2$ and on the inner surface thereof are formed a plurality of blocks $c^3$ formed with curved lower surfaces grooved preferably to receive the non-metallic connecting cord.

To the upper portion of the pedestal $a$ there is secured a frame $d$ having a top plate $d'$ turned downwardly at the two sides as at $d^2$ and formed with a plurality of blocks $d^3$ similar in every respect to the blocks $c^3$ but formed with a curved grooved surface uppermost.

To the respective front and rear corners $c^4$, $c^5$ frame $c$ there is secured, at its respective ends, a length of yielding non-metallic cord $d^x$, such as aeroplane cord. Such cord consists of strands of rubber and silk. This cord is led downwardly and inwardly to the proximate corners $d^4$, $d^5$, respectively, of frame $d$ to which it is secured as by clamps $e$. From, say corner $d^4$, the cord is led downwardly and outwardly to the most forwardly disposed block $c^3$ around the grooved lower surface of which it is bent and from thence upwardly around the most forwardly disposed block $d^3$. The cord is thus wound between alternate blocks $d^3$ and $c^3$, respectively, to the most rearwardly of the blocks $c^3$ from whence it is led upwardly and inwardly to the rear corner $d^5$ of frame $d$ where it is clamped by a clamp $e$ and then led outwardly and upwardly to the corner $c^5$.

From the foregoing description the advantages and manner of using the improved suspension should be apparent. The seat frame $d$ carrying the seat $b$ and arms and back $b^2$ and $b'$, respectively, is supported yieldingly by the lengths of cord. As the loops of cord lie in inclined planes along the sides of the seat, not only is adequate support given thereto but a degree of universal movement with suitable constraint is afforded for the seat which contributes to the comfort of the passenger. The inclined ends of the cords $d^6$ at the front and rear of the chair resist yieldingly the application of greatest weight which will naturally be impressed in a fore and aft direction by an occupant reclining against the back or sitting down or rising from the seat. The lengths $d^6$ also tend to snub any tendency toward vertical movement. It may be possible to assemble the parts with the cord under tension, that is, subject to an internal static load. Subsequent adjustment of its length or tension may be readily made through the various clamps $e$ and $f$. Lateral movements of the seat frame are resisted directly by the inclination of the loops.

As pointed out hereinbefore the invention is not to be limited to the particular type of frame supported so long as the general requirements are as described and modifications in the details of connections may be made as desired.

What I claim is:

1. In combination, a pedestal formed with a frame, a seat having a frame outwardly of the first named frame, a plurality of blocks having curved surfaces disposed on the sides of the two frames respectively, alternate surfaces being reversely curved with respect to one another, a flexible cord, means securing the same at its ends to the corners of the seat frame, the cord extending to proximate corners of the base frame, and means to clamp the cord thereon, said cord extending between the blocks having alternate curved surfaces to form a yielding support therebetween.

2. In combination, a seat frame, a base frame, lengths of flexible cord on each side of the frames and connecting the two, and means to connect the lengths of each side to the frames at a plurality of points, said means being positioned to cause portions of each length to lie in different inclined planes with respect to other portions of the same length.

3. In combination, a seat frame, a base frame within the same and of smaller size, lengths of cord connecting the two, means for connecting the lengths at each end to one frame, and at points intermediate the ends to the frame in a different plane from that of the first connections, and means for connecting the lengths to the other frame at a point between the ends and in a vertical plane different from that in which the first connecting means lie, whereby the resultant of the forces in the portions of each length lies at an angle to the vertical.

This specification signed this 11th day of Dec., A. D. 1924.

FRANK KOHLBERGER.